(12) United States Patent
Scalone

(10) Patent No.: US 7,377,113 B2
(45) Date of Patent: May 27, 2008

(54) MODULAR TURBINE GENERATOR AND METHOD OF OPERATION

(76) Inventor: John Scalone, 4294 Camino Alegre, La Mesa, CA (US) 91941

( * ) Notice: Subject to any disclaimer, the term of this patent is extended or adjusted under 35 U.S.C. 154(b) by 511 days.

(21) Appl. No.: 11/005,337

(22) Filed: Dec. 6, 2004

(65) Prior Publication Data

US 2008/0098744 A1     May 1, 2008

(51) Int. Cl.
*F02C 3/30*     (2006.01)
(52) U.S. Cl. .......................... 60/775; 62/304
(58) Field of Classification Search ................. 60/775; 62/304, 314, 259.2
See application file for complete search history.

(56) References Cited

U.S. PATENT DOCUMENTS

| | | | |
|---|---|---|---|
| 5,079,934 A * | 1/1992 | Vinokurov | 62/304 |
| 5,790,972 A * | 8/1998 | Kohlenberger | 701/103 |
| 6,213,194 B1 * | 4/2001 | Chrysler et al. | 165/80.3 |
| 6,526,768 B2 * | 3/2003 | Wall et al. | 62/184 |
| 6,923,003 B2 * | 8/2005 | Willems et al. | 60/775 |
| 6,923,014 B2 * | 8/2005 | Goth et al. | 62/259.2 |
| 6,948,331 B1 * | 9/2005 | Ho | 62/401 |
| 7,310,950 B2 * | 12/2007 | Dovali-Solis et al. | 60/773 |
| 2002/0066265 A1 * | 6/2002 | Tsuji | 60/39.182 |
| 2004/0107718 A1 * | 6/2004 | Bowman et al. | 62/259.2 |
| 2005/0022536 A1 * | 2/2005 | Dovali-Solis et al. | 60/772 |

* cited by examiner

*Primary Examiner*—William H. Rodriguez
(74) *Attorney, Agent, or Firm*—Terry L. Miller

(57) ABSTRACT

A modular turbine generator includes both a turbo generator, and electrical power conditioning and control circuitry. During conditions of high ambient temperature the turbo generator may lose both power output and efficiency, while the electrical circuitry suffers from shortened service life or failure because of the high temperatures experienced. In order to preserve power output and efficiency for the turbo generator, as well as extending the service life span for the electrical power conditioning and control circuitry, a dual function evaporative cooler is provided. This cooler provides evaporatively cooled air both to the turbine engine and to the electrical circuitry by utilizing a single evaporative pad, along with a single water source and recirculation pump, all received in a compact cabinet.

12 Claims, 3 Drawing Sheets

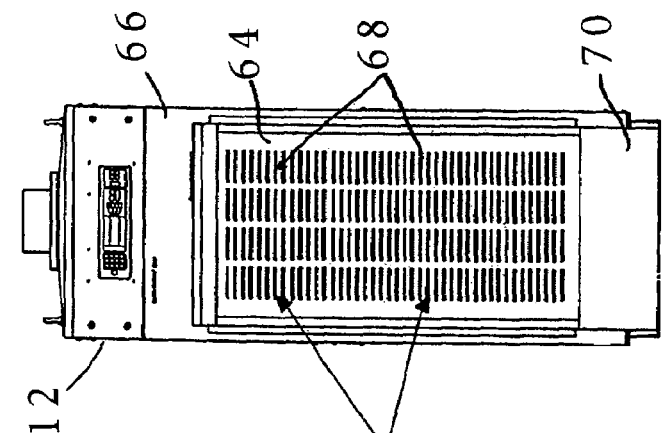
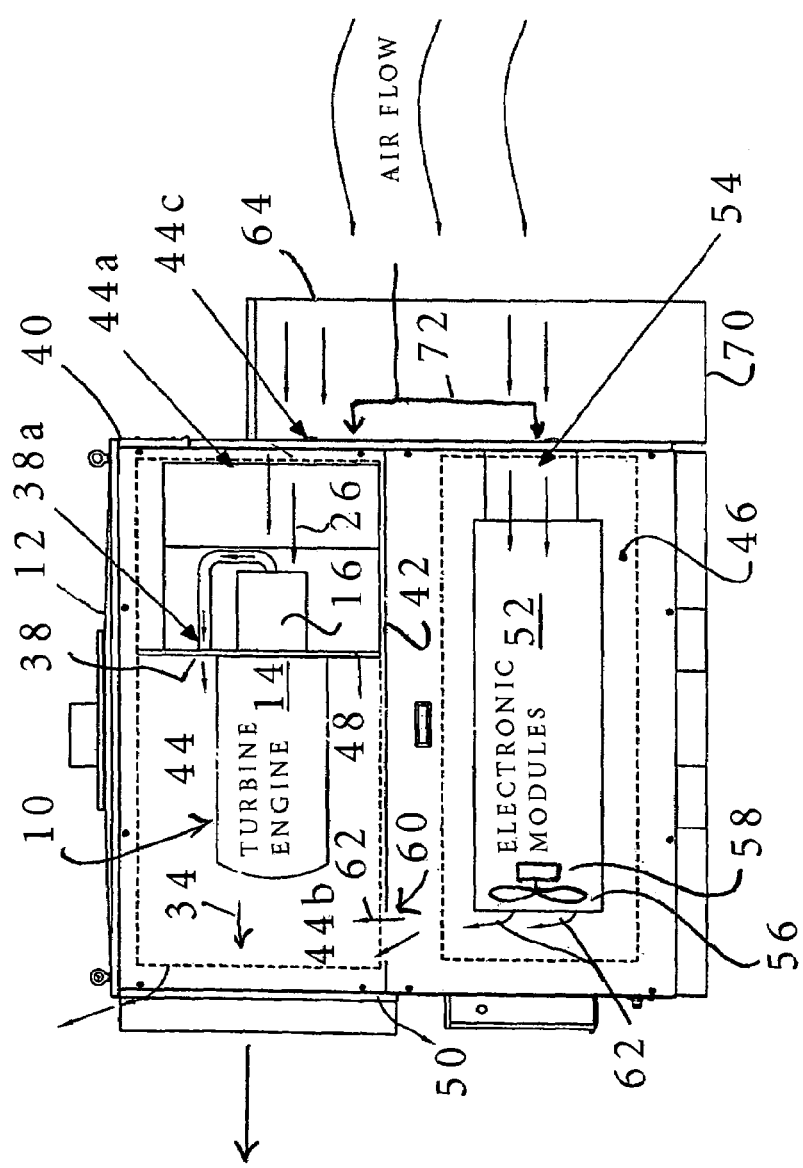

Net Power Gain at 0.1% Design Day = 14kW

Net Efficiency Gain at 0.1% Design Day = 3.4%

MODULAR TURBINE GENERATOR AND METHOD OF OPERATION

TECHNICAL FIELD

This invention is in the field of electrical power generation, and relates more particularly to an improved modular turbo generator and method of its operation for sustaining electrical output level despite high ambient temperature conditions.

RELATED TECHNOLOGY

Electric utilities are now grappling with the challenge of deregulation and competition at a time of relatively slow growth in electricity demands. While plans for huge power plants are being shelved because of high costs and environmental concerns, new customers must still be supplied with electrical power. Existing plants and transmission lines are simply becoming overwhelmed in some areas. Nuclear power plants are also fast becoming economically and environmentally undesirable.

One alternative to generating electrical power on a more local basis, minimizing reliance on long distance power transmission, is called a "turbo generator." Such a turbo generator is a modular unit, and this turbo generator includes a comparatively small gas turbine engine combined on a common shaft with an electrical generator. The engine and generator are modular within a cabinet with power conditioning and control circuitry needed for starting and control of the turbo generator, as well as for power conditioning to produce line power.

When a permanent magnet generator/motor is utilized, the combination is referred to as a permanent magnet turbo generator. The permanent magnet turbo generator has an advantage in that the permanent magnet generator may also be operated as a permanent magnet brushless motor to start the turbine engine. Thus, this device may be referred to as a permanent magnet generator/motor.

During operation of the turbogenerator, intake air is drawn through the permanent magnet motor/motor by the gas turbine compressor which increases the pressure of the air and forces it into a recuperator. The recuperator receives exhaust gases from the gas turbine and extracts heat in order to preheat the intake air before it enters the gas turbine combustor. In the combustor, the preheated air is mixed with fuel and burned. The combustion gases are then expanded in the turbine which drives the compressor. The permanent magnet rotor of the permanent magnet motor/motor is mounted on the same shaft as the gas turbine and compressor. The expanded turbine exhaust gases are then passed through the recuperator before being discharged from the motor/motor.

A permanent magnet motor/motor generally includes a rotor assembly having a plurality of equally circumferentially spaced permanent magnet poles of alternating polarity. These magnetic poles are spaced around the outer periphery of the rotor or, in more recent times, the rotor is formed from a solid permanent magnet structure of samarium cobalt or neodymium-iron-boron. The rotor is rotational within a stator which generally includes a plurality of windings and magnetic poles of alternating polarity. In a generator mode, rotation of the rotor causes the permanent magnets to pass by the stator poles and coils and thereby induces an electric current to flow in each of the coils. Alternately, if an electric current is passed through the stator coils and commutation is provided, then the energized coils will cause the rotor to rotate and thus the generator will perform as a motor.

A permanent magnet motor/motor can be utilized to provide electrical power for a wide range of utility, commercial and industrial applications. While an individual permanent magnet turbo generator may only generate 24 to 60 kilowatts, power plants of up to 500 kilowatts or greater are possible by linking numerous permanent magnet motors/motors together. Standby power, peak load shaving power and remote location power are just several of the potential utility applications for which these lightweight, low noise, low cost, environmentally friendly, and thermally efficient units can be useful.

In order to best meet the requirements of utility companies and other potential users of a turbo generator, particularly when the permanent magnet motor/motor is to operate as a supplement to utility power, it is desirable to maintain the electrical power output of such a permanent magnet turbo generator despite high ambient temperature conditions.

SUMMARY OF THE INVENTION

A turbo generator according to the present invention includes a turbine engine with compressor, combustor, and turbine; and a generator drivingly linked to the compressor and turbine. A microprocessor-based inverter having multiple modes of operation is electrically connected to the generator. In order to start the turbine, the inverter connects to and supplies fixed current, variable voltage, variable frequency, AC power to the permanent magnet motor/motor, thus driving the permanent magnet motor/motor as a motor to accelerate the gas turbine. During this acceleration, and at the appropriate time, an ignition source (i.e., such as a spark) is provided along with fuel introduced in the correct volume and sequence, and self-sustaining gas turbine operating conditions are reached.

After the self-sustaining conditions are reached for the turbine engine, the inverter is disconnected from the permanent magnet generator/motor, and this generator/motor is reconfigured to provide a controlled 60 hertz electrical power output mode. The turbo generator then either supplies regulated 60 hertz three phase power to a stand alone load, or phase locks to the utility, or to other like controllers, in order to operate as a supplement to the utility. In this mode of operation, the power for the inverter is derived from the permanent magnet generator/motor via high frequency rectifier bridges. The microprocessor monitors turbine conditions and controls fuel flow to the gas turbine combustor.

Because the voltage derived from the permanent magnet generator/motor is a function of rotational speed and the load, inverter input voltage requirements limit the operational speed of the gas turbine from approximately 72,000 rpm to a top speed of about 96,000 rpm. The inverter is direct coupled to the utility, therefore the inverter voltage rating is established by the utility for grid connect operation, and has a narrow range for stand alone operation. Thus, an electrical power conditioning function is performed by the turbo generator, converting the high frequency power from the generator into 60 Hz power for the electrical grid or for the user of this power in a stand-alone operation.

In order to preserve the power output level of the turbo generator during conditions of high ambient temperature, a dual function evaporative cooler is associated with the turbo generator. This dual function evaporative cooler cools both the intake air to the turbine engine, as well as cooling air utilized for cooling the electronic control and power conditioning circuitry. Accordingly, the turbine engine has both improved power output and efficiency during high ambient temperature conditions compared to the performance this engine would provide were the evaporative cooler not employed. Further, the electronic circuitry of the power conditioning and control section of the turbo generator is prevented from exposure to excessively high temperature conditions, and the life of the electronic components is thus preserved.

Thus, and object for this invention is to provide a dual function evaporative cooler for use in conjunction with a turbo generator.

Another object for this invention is to provide a method of operating a turbo generator in conjunction with a dual function evaporative cooler.

Still another object for this invention is to provide a uniquely configured dual function evaporative cooler which is especially configured to be used in conjunction with a modular turbo generator in order to cool both intake air for a turbine engine of the turbo generator, and to cool air utilized to cool an electrical circuitry of the turbo generator.

These and other objects and advantages of the present invention will be apparent from a reading of the following description of a single exemplary preferred embodiment of the invention, taken in conjunction with the appended drawing Figures.

BRIEF DESCRIPTION OF THE DRAWINGS

FIGS. 2 and 3, respectively, are side elevation and end elevation views of a modular turbo generator embodying the present invention, and including a dual-function evaporative cooler, with FIG. 2 being shown partly in cross section for clarity of illustration;

DETAILED DESCRIPTION OF AN EXEMPLARY PREFERRED EMBODIMENT

Figure 1:
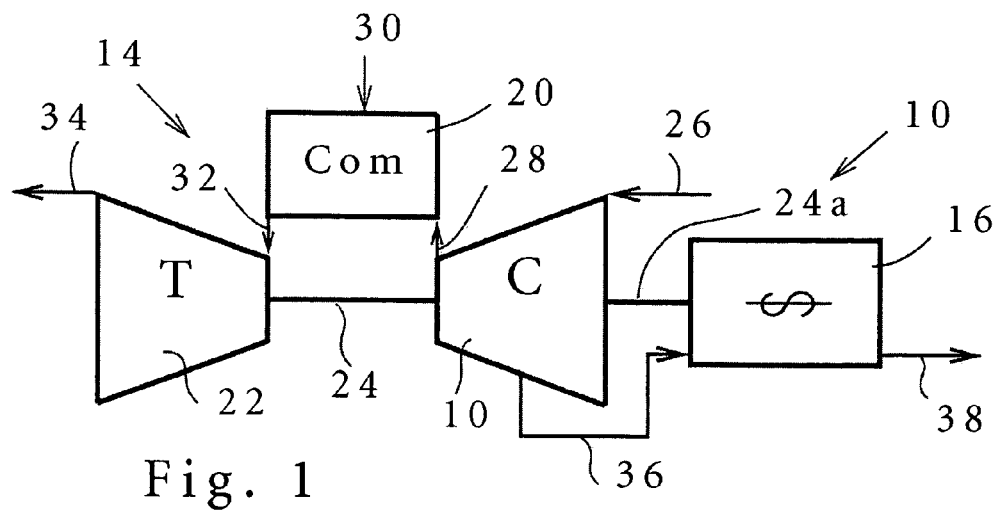
FIG. 1 is a diagrammatic view of a permanent magnet turbo generator.

A turbine engine and generator portion 10 of a modular permanent magnet turbo generator 12 (best seen in FIGS. 2 and 3) is illustrated in FIG. 1. The portion 10 includes a turbine engine 14 (sometimes referred to as a power head), and a permanent magnet generator/motor 16. The turbine engine 14 includes a compressor 18, combustor 20, and turbine 22. The turbine 22 drives a shaft 24 drivingly coupled to the compressor 18, and this driving connection includes a portion 24a drivingly connecting to and providing shaft t power to the generator 16. Compressor 18 receives inlet air (as is indicated by arrow 26 and delivers pressurized combustion air to the combustor 20, as is indicated by arrow 28. The combustor receives the pressurized combustion air 28 along with a supply of fuel, indicated by arrow 30, to maintain combustion providing a flow of pressurized combustion products. These pressurized combustion products flow from the combustor to the turbine 22, as is indicated by arrow 32. On the turbine, the combustion products are expanded toward ambient pressure and temperature, providing shaft power delivered by shaft 24 and shaft portion 24a, to drive the compressor and generator.

The expanded combustion products are exhausted from the turbine, as is indicated by arrow 34. It will be recognized that the turbine engine 14 defines a flow path indicated by the compressor 18, combustor 20, and turbine 22 along with arrows 26, 28, 32, and 34, communicating ingested intake air and exhausting combustion products. However, this flow path also includes a bleed air cooling branch 36 which receives pressurized air from compressor 18 and delivers this cooling air for circulation through the generator 16. The spent and heated cooling air is exhausted from the generator 16 as is indicated by arrow 38.

Although such is not shown on FIG. 1, those ordinarily skilled in the pertinent arts will appreciate that a regenerator or recuperator may be used in conjunction with the turbine engine 14. Such a regenerator or recuperator extracts heat from the exhaust flow 34, and delivers this heat to the pressurized air 28, in order to improve the thermodynamic efficiency of the turbine engine 14.

Turning now to FIGS. 2 and 3 in conjunction with one another, it is seen that the modular turbo generator 12 includes a housing 40 which is divided by a partition 42 into an upper cavity 44 and a lower cavity 46. The upper cavity 44 is again divided by a partition 48 into a cool air intake cavity 44a, and a warm exhaust products cavity 44b. Disposed in the upper cavity 44 is a turbo generator unit 10 including a turbine engine component 14, and a generator component 16 (recalling the description of FIG. 1 above). The turbine engine 14 draws cool air from cavity 44a (arrows 26) and exhausts combustion products into cavity 44b (arrows 34). The housing 40 defines a combustion air intake 44c communicating into the cavity 44a.

From the cavity 44b, an exhaust opening 50 provides for air flow (i.e., combustion products flow) to ambient (arrow 50a). It should be noted that a conduit 38a provides for cooling air to be exhausted (arrow 38) form the generator 16 into the cavity 44b. Those ordinarily skilled in the pertinent arts will understand that the engine 14 and generator 16 are connected to electrical power conditioning and control circuitry 52 disposed in the cavity 46. In order to provide cooling air flow to the circuitry 52, the housing 40 defines a cooling air intake 54. A fan 56 disposed in the cavity 46 is driven by a motor 58 and is effective to move cooling air across the circuitry 52 and to exhaust the heated air via a slot 60 in partition 42 into the cavity 44b, as is indicated best on FIG. 2 by arrows 62.

In order to preserve or maintain power output and efficiency of the modular turbo generator 12 under conditions of high ambient temperature, the turbo generator 12 is associated with a dual-function evaporative cooler 64. This dual-function evaporative cooler 64 includes a cabinet 66 having an upper extent defining a plurality of air intake louvers 68 (best seen in FIG. 3), and a lower extent 70, which will be explained below to define a sump for the evaporative cooler 64. This evaporative cooler 64 receives high-temperature ambient air, cools this ambient air by evaporative cooling through direct contact of the air with a water-moistened evaporative pad, and then (as is indicated on FIG. 2 by the bifurcated air flow arrow 72), distributes the cooled air both to the intake 44c, and to the intake 54. Thus, the cooled air provided by the evaporative cooler 62 is effective to provide both cooler combustion air for the turbine engine 14, and cooler cooling air for extracting and carrying away heat from the electrical power conditioning and control circuitry 52.

Figure 4:
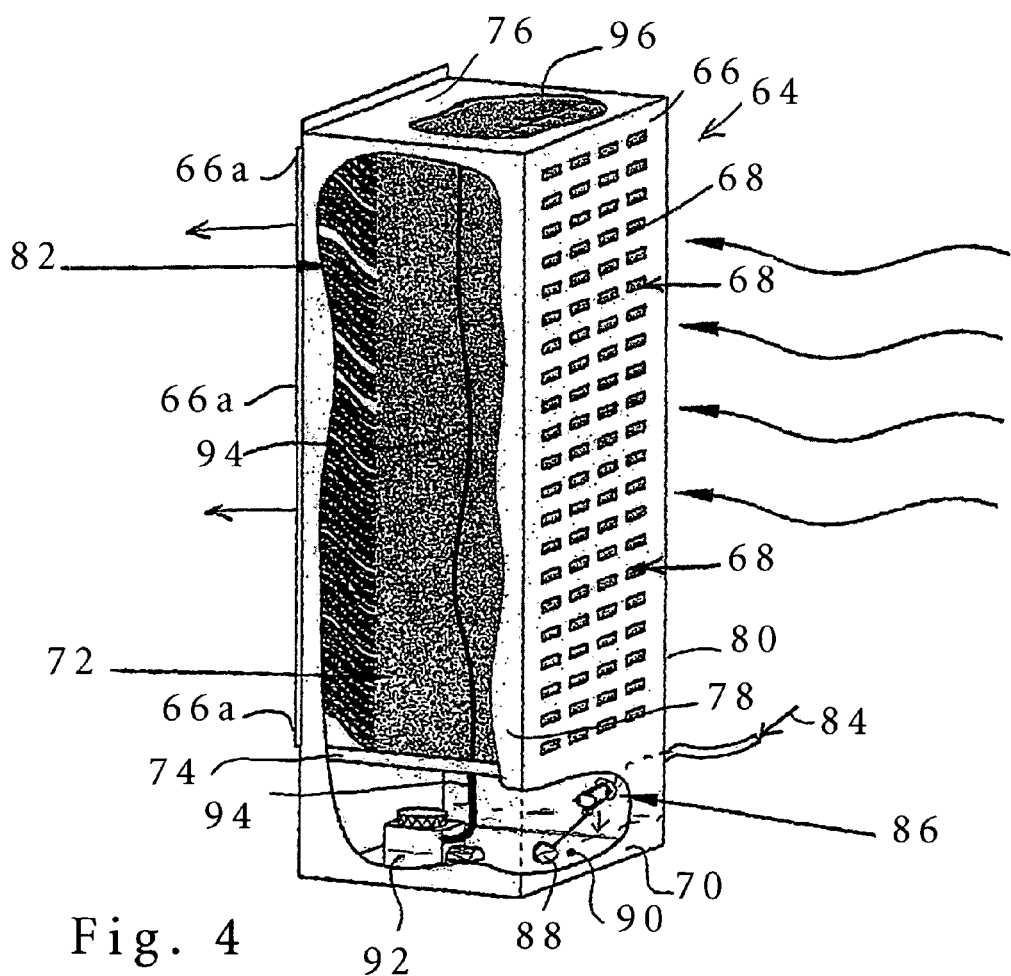
FIG. 4 is a perspective elevation view, partially cut away for clarity of illustration, of a dual-function evaporative cooler according to the present invention.

Considering now FIG. 4, it is seen that the dual-function evaporative cooler 64 includes a cabinet 66 which is elongate in the vertical direction. This vertical elongation of the cabinet 66 allows the cabinet to define a similarly vertically elongate air outlet 66a which spans and communicates with each of the intake openings 44c and 54 of the housing 40. Further, as is seen in FIG. 3, the cabinet 66 is also sized in its horizontal dimension to substantially match the size of the housing 40 at the intakes 44c and 54. Accordingly, air flowing into the intakes 44c and 54 must pass through the cabinet 66 of the evaporative cooler 64. Disposed in an upper extent of the cabinet 66 between the louvers 68 and the outlet opening 66a, is a vertically elongate air-permeable evaporative pad 72. This pad 72 extends vertically between a perforate horizontal partition 74 and a top wall 76 of the cabinet 66. Similarly, the pad 72 extends horizontally between a pair of opposed vertical side walls 78 and 80 of the cabinet. Accordingly, it will be understood that all of the air flow through the louvers 68 must pass through the pad 72 in order to reach the outlet 66a. Finally, it is to be noted that the pad 72 extends between the openings of louvers 68 and a moisture separator structure 82. The moisture separator structure 82 is disposed immediately adjacent to the outlet 66a, and provides for moisture separated from the air flow to drain onto and through the perforate partition 74.

In order to moisten the evaporative pad 72 with water, the cabinet portion 70 defines a water sump for the evaporative cooler 64. That is, this sump portion provides a basin for receiving water draining from the evaporative pad 72, as well as receiving fresh water for use in moistening this evaporative pad. To this end, the sump portion 70 is provided with a water connection (arrow 84) from a source of fresh water. This water is provided to a level control valve 86 having a float 88 effective to maintain a controlled depth of water 90 in the sump 70. That is, the water level 90 in the sump 70 is generally indicated by the dashed lines on FIG. 4. In order to moisten the pad 72, a submersible pump unit 92 is disposed in the sump 70 and draws water from this sump for discharge along a vertically extending conduit 94 to a distribution manifold 96 disposed above pad 72. Thus, when water is provided to sump 70 (via connection 84) and the pump 92 is operated (via an electrical connection not shown on the drawing Figures), then the pad 72 will be moistened, and intake air for the modular turbo generator 12 will be evaporatively cooled by its passage through the moist evaporative pad 72. The evaporative cooler 66 does not and need not employ or incorporate its own fan for drawing air through the pad 72 because the modular turbo generator 12 provides for this air flow. Further, because the dual-function evaporative cooler 66 communicates with each of the air intakes 44c and 54, both the turbine engine 14 and the electrical circuitry 52 receive evaporatively cooled air.

Figure 5:
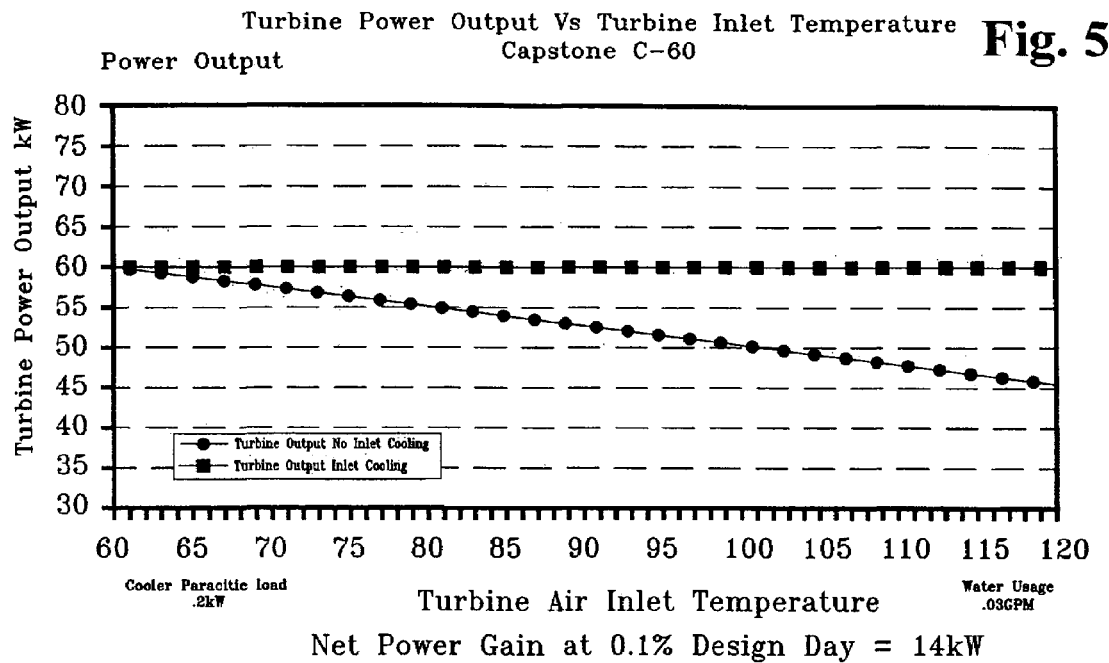
FIGS. 5 and 6, respectively, are graphical illustrations of power and efficiency improvements obtained by use of an exemplary embodiment of the present invention in conjunction with a conventional modular combustion turbo generator.
Figure 6:
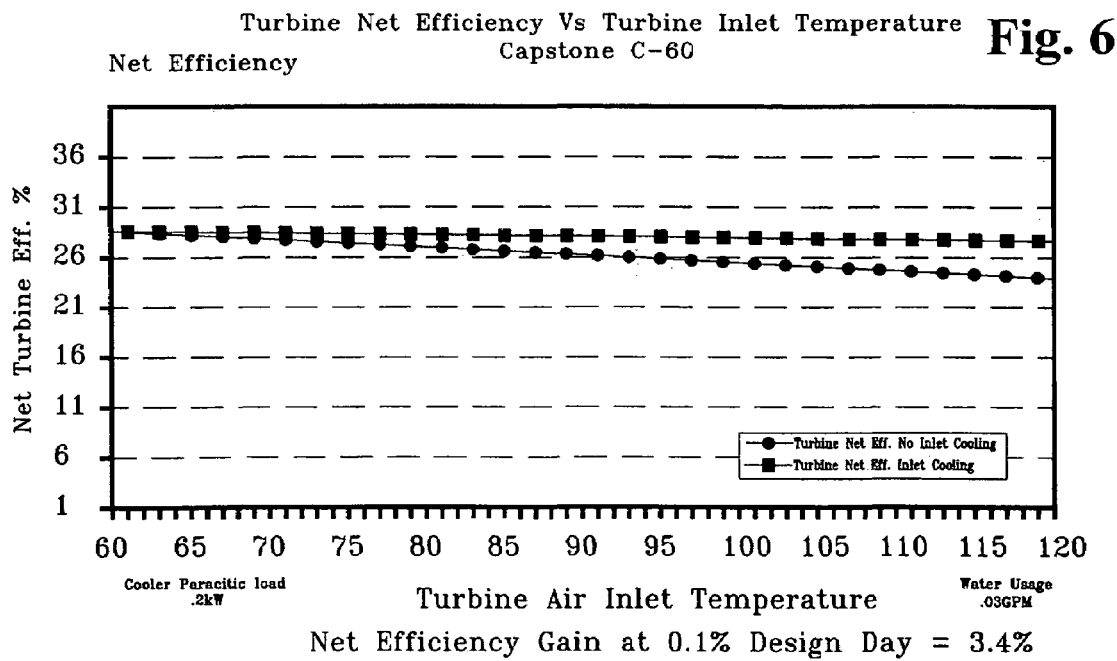

Considering now FIGS. 5 and 6, the standard performance of a modular turbo generator (power output and efficiency) under ambient conditions of high temperature both with and without the benefit of this invention are illustrated. FIG. 5 shows that the power output of a 60 Kw unit may sag by as much as about 14 Kw at a temperature of 120° F. Under these same conditions, the efficiency of the modular turbo generator may decline by as much as about 3.4%. Those ordinarily skilled will appreciate that these performance losses under high temperature ambient conditions are actually additive. That is, the power output of the modular turbine generator declines, and its fuel efficiency also declines so that a greater fuel consumption is required for each Kw of electrical power produced. On the other hand, FIGS. 5 and 6 also illustrate that by use of the present invention, both the power output and efficiency of the modular turbine generator can be substantially preserved.

While specific embodiments of the invention have been illustrated and described, it is to be understood that these are provided by way of example only and that the invention is not to be construed as being limited thereto but only by the proper scope of the following claims.

What is claimed is:

1. A modular turbine generator comprising:
    a housing defining an inlet, an outlet, and a flow path extending between said inlet and said outlet;
    a compressor disposed in said flow path for receiving inlet air and providing pressurized air;
    a combustor disposed in said flow path for receiving said pressurized air along with a flow of fuel to maintaining combustion to provide pressurized combustion products;
    a turbine disposed in said flow path for receiving said pressurized combustion products and expanding said combustion products toward ambient pressure to provide rotational power to a shaft;
    said shaft drivingly connecting with said compressor and with an electrical generator for providing electrical power;
    said housing providing a second flow path extending between a respective inlet and respective outlet;
    power conditioning and control circuitry disposed in said second flow path and receiving said electrical power to provide line power; and
    a dual mode evaporative cooler defining an ambient air intake leading to an air-permeable moist evaporative pad, and air flow communication from said evaporative pad to said inlet, and an air flow communication from said evaporative pad to said respective inlet.

2. The invention of claim 1 wherein said dual mode evaporative cooler further includes a water source and means for delivering water from said source to said evaporative pad to moisten said pad.

3. The invention of claim 2 wherein said water source includes a potable water connection, a water sump receiving potable water from said connection as well as water draining from said pad, and a motor-driven pump delivering water from said sump to an upper extent of said evaporative pad.

4. The invention of claim 1 wherein said turbine generator further includes a fan disposed in said second flow path for moving air from said evaporative pad and between said respective inlet and to said respective outlet.

5. A method of substantially maintaining design power output for a modular turbine generator including electrical power conditioning and control circuitry despite conditions of high ambient temperature, said method comprising steps of:
    providing an ambient air intake and a bifurcating air flow path extending between said intake and a pair of air flow communications to said modular turbine generator;
    disposing a moist air-permeable evaporative pad in said air flow path;
    flowing ambient air received via said intake through said evaporative pad while utilizing evaporative cooling to cool said air, and bifurcating said air flow;
    flowing cooled air via a first of said pair of air flow communications to a turbine engine of said modular turbine generator; and simultaneously flowing cooled air via a second of said pair of air flow communications to said electrical power conditioning and control circuitry.

6. The method of claim 5 further including the step of providing a water source, and providing means for delivering water from said source to said evaporative pad so as to moisten said pad.

7. The method of claim 6 including the steps of including in said water source a potable water connection, providing a water sump disposed below said evaporative pad, utilizing said water sump to receive potable water from said connection as well as water draining from said pad, and providing a pump delivering water from said sump to an upper extent of said evaporative pad.

8. The method of claim 5 further including the steps of providing a fan disposed in association with said power conditioning and control circuitry, and utilizing said fan to move air from said evaporative pad across said circuitry.

9. A dual-function evaporative cooler especially configured for use with a modular turbine generator having a turbine engine driving an electrical generator and an electrical power conditioning and control circuitry, said turbine generator having a combustion air inlet leading to said turbine engine, and a cooling air inlet leading to said electrical power conditioning and control circuitry, said evaporative cooler comprising:

a cabinet defining an ambient air intake, an air outlet, and an air flow path extending between said intake and said outlet, an air-permeable moist evaporative pad disposed in said air flow path for receiving ambient air via said intake and providing cooled air via said outlet;

said cabinet being especially configured to span and communicate cooled air with both said combustion air inlet, and with said cooling air inlet so as to simultaneously provide cooled air from said evaporative pad to said turbine engine and to said electrical power conditioning and control circuitry.

10. The invention of claim 9 wherein said dual-function evaporative cooler further includes a water source and means for delivering water from said source to said evaporative pad to moisten said pad.

11. The invention of claim 10 wherein said water source includes a potable water connection, a water sump disposed in a lower extent of said cabinet and receiving potable water from said connection as well as water draining from said pad, and a pump disposed in said sump and delivering water from said sump to an upper extent of said evaporative pad.

12. The invention of claim 9 wherein said turbine generator further includes a fan disposed in said second flow path for moving air from said evaporative pad via said cooling air inlet and across said electrical power conditioning and control circuitry.

* * * * *